United States Patent [19]

Dorste et al.

[11] Patent Number: 4,911,404

[45] Date of Patent: Mar. 27, 1990

[54] ELECTRONICALLY OPERATED EXPANSION VALVE

[75] Inventors: David C. Dorste, St. Louis; Dennis L. Hoehne, Rock Hill, both of Mo.

[73] Assignee: Sporlan Valve Company, St. Louis, Mo.

[21] Appl. No.: 387,352

[22] Filed: Jul. 28, 1989

[51] Int. Cl.[4] ............................................. F16K 31/04
[52] U.S. Cl. ........................ 251/129.08; 251/129.11; 251/129.12; 251/282
[58] Field of Search .................. 251/129.12, 129.08, 251/129.11, 282

[56] References Cited

U.S. PATENT DOCUMENTS

| | | | |
|---|---|---|---|
| 1,729,015 | 9/1929 | Spoehrer | 251/249.5 |
| 3,323,548 | 6/1967 | Ludwig | 137/625.35 |
| 3,738,573 | 6/1973 | Eschbaugh | 236/92 B |
| 4,133,511 | 1/1979 | Hartmann et al. | 251/133 |
| 4,154,425 | 5/1979 | Smith | 251/133 |
| 4,229,387 | 10/1980 | Rogerson et al. | 261/66 |
| 4,333,026 | 6/1982 | Bock et al. | 310/42 |
| 4,353,523 | 10/1982 | Palti | 251/65 |
| 4,378,767 | 4/1983 | Kobashi et al. | 123/339 |
| 4,381,747 | 5/1983 | Kobayashi | 123/339 |
| 4,382,578 | 5/1983 | Ruyak | 251/65 |
| 4,393,319 | 7/1983 | Bock | 310/80 |
| 4,399,737 | 7/1982 | Meyers et al. | 335/272 |
| 4,414,942 | 11/1983 | Itoh et al. | 123/339 |
| 4,431,161 | 2/1984 | Miller et al. | 251/133 |
| 4,452,423 | 6/1984 | Beblabi et al. | 251/65 |
| 4,480,614 | 11/1984 | Kobashi et al. | 251/129.12 X |
| 4,499,920 | 2/1985 | Steffan et al. | 137/624.5 |
| 4,501,297 | 2/1985 | Baker | 137/625.46 |
| 4,506,518 | 3/1985 | Yoshikawa | 62/180 |
| 4,523,436 | 6/1985 | Schebel et al. | 251/129.11 X |
| 4,593,881 | 6/1986 | Yoshino | 251/129.11 X |
| 4,763,874 | 8/1988 | OGawa | 251/129.11 X |

*Primary Examiner*—Arnold Rosenthal
*Attorney, Agent, or Firm*—Cohn, Powell & Hind

[57] ABSTRACT

This refrigeration system expansion valve assembly (10) includes a valve body (12) having an upper portion (14) an intermediate portion (15) providing a valve chamber (17) and a valve port (18), and a lower portion (16). A valve inlet (20) and outlet (22) communicate with the valve chamber (17) on each side of the valve port (18). A piston assembly (24) is mounted in the body (12) for closing the valve port (18). The piston assembly (24) is actuated by a push rod assembly (26) driven by a stepper motor 28. The push rod assembly (26) includes a threaded member (102) slidingly and non-rotatively mounted in the body (12) and linearly driven by the motor shaft (30) which is threadedly received by said threaded member (102). The piston assembly (24) is urged into engagement with the push rod assembly (26) by a return spring (36) and includes a fluted nose portion (80) and a bleed passage (90, 92) communicating valve chamber (17) and the spring compartment (75).

12 Claims, 2 Drawing Sheets

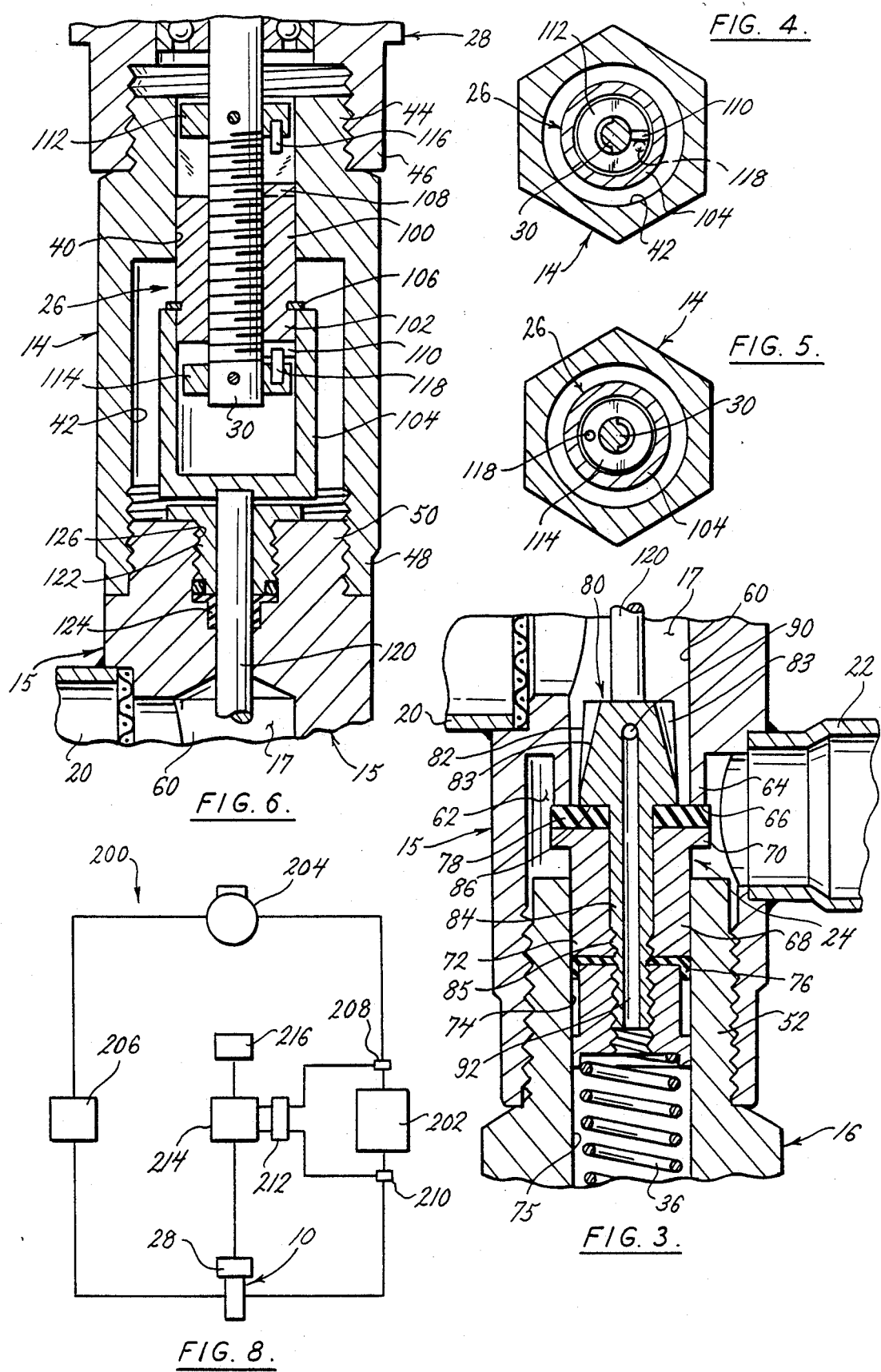

ELECTRONICALLY OPERATED EXPANSION VALVE

BACKGROUND OF THE INVENTION

This invention relates generally to expansion valves used in refrigeration sytems and more particularly to an expansion valve which utilizes a stepper motor to control an adjustable orifice between the inlet and outlet ports of the valve.

The control of an expansion valve adjustable orifice by electronic rather than more direct thermostatic means is not in itself new and there are particular advantages in using a stepper motor to control the valve opening.

A stepper motor actuated valve provides discrete segments of valve stroke for each incremental angular movement (step) of the motor and has the advantages of being easily incorporated into a digital control system because the reliability and low hysterisis provide precise repeatable valve positions which can eliminate costly feed back loops. Such a valve is disclosed in U.S. Pat. No. 4,523,436 and utilizes a pair of telescopically related sleeves. The interior sleeve is stationary and includes an elongate sidewall orifice. The external sleeve is movable by a lead screw which is non-rotational and is driven in a linear direction by a stepper motor. In this telescopic expansion valve the lead screw does not rotate. However, there may be torsional frictional engagement between the lead screw motor when the valve bottoms out. Also, while such stepper motors are capable of precise control within the stroke limits, the requirement of a non-rotatable lead screw, which is subject to linear movement only, is a disadvantage and the provision of telescopic sleeves is an added expense.

It is considerably less expensive and more convenient to provide a stepper motor drive for a rotatable lead screw since the lead screw can be directly connected to the stepper motor. However, when a piston type valve is used to close a circular valve port or orifice, the use of a rotatable lead screw tends to result in undesirable torsional frictional engagement between the lead screw and valve parts at valve closure. Such engagement can result in binding which requires additional motor force to overcome in order to release the valve.

Another approach is to use a stepper motor having a pinion mounted to the rotor which is used to drive a rack type actuating member to operate the piston. Unfortunately, in addition to the expense and complexity, the precise control which is available with a stepper motor utilizing a lead screw is lost since the resolution is considerably less with a rack.

The present stepper motor actuated expansion valve overcomes the above and other problems in a manner not disclosed in the known prior art.

SUMMARY OF THE INVENTION

This expansion valve has an adjustable orifice which is precisely controlled by means of a stepper motor drive system.

A drive coupling is provided between the stepper motor and the valve which provides the rotary to linear translation necessary to open the valve and incorporates stops which accurately define the linear movement of valve member relative to the valve port.

The stops provide a means of limiting rotary motion of the stepper motor shaft and allow the valve to move between a fully open and fully closed position without the binding of relatively rotating valve parts and allow the motor to stop in a detent position under a known load which ensures reliability when reversing direction.

This expansion valve utilizes a piston assembly which is balanced to high side pressure by a bleed system through the piston.

A sealing system is provided between the valve chamber and the stepper motor to protect the motor cavity and bearings from the ingress of dirt. In addition, the piston is configured to facilitate linear flow of refrigerant through the valve during the entire valve stroke.

This invention provides an expansion valve which includes a hollow body including an upper portion, a lower portion and a valve chamber disposed between said upper and lower portions and including a valve port having seating means; an inlet means communicating with the valve chamber on one side of the valve port and an outlet means communicating with the valve chamber on the other side of the valve port; piston means linearly movable in said body between a valve open and valve closed position, said piston means being operatively seated against said valve port seating means in the closed position; push rod means including a threaded member mounted for linear movement in the body and operatively engageable with the piston means to induce linear movement into said piston means, said push rod means including stop means; a stepper motor carried by the upper portion of the body and including a rotatable shaft means threadedly received by the threaded member of the push rod means, said rotatable shaft means including cooperating stop means engageable with the stop means of the push rod means to limit angular rotation of the rotatable shaft means whereby to precisely determine linear travel of the push rod means and the piston means, and spring means carried by the lower portion of the body and operatively engageable with the piston means to urge the piston means into operative engagement with the push rod means.

It is an aspect of this invention to provide that the push rod threaded member receiving the rotatable shaft means is adapted to slide linearly and non-rotatively in the upper portion of the body and includes a projecting member providing the stop means, and the threaded shaft means includes a projecting member providing the stop means and being engageable with the push rod member projecting member to determine the sealing pressure of the piston means on the valve seating means.

It is another aspect of this invention to provide that the push rod threaded member includes upper and lower projecting members disposed in spaced relation and providing the stop means, and the rotatable shaft means includes upper and lower projecting members providing the stop means and being engageable with associated upper and lower push rod projecting members to determine the stroke of the piston means, engagement of associated lower projecting members determining the sealing pressure of the piston means on the valve seating means.

Yet another aspect of this invention is to provide that the upper portion of the body includes a non-circular passage; the push rod means includes an upper internally threaded member receiving the rotatable shaft means and being externally configured to be received in sliding relation in said non-circular body passage; a lower housing member carried by said threaded member, and a push rod extending between said housing member and said piston means, said threaded member including upper and lower projecting members providing said stop means, and said rotatable shaft means includes an upper portion disposed above said threaded member and a lower portion disposed below said threaded member within said housing member, said upper and lower portions each including a projecting member providing said stop means and being engageable with an associated projecting member of said threaded member.

Still another aspect of this invention is to provide that the threaded member upper portion includes a fixed collar having a downwardly projecting pin providing said projecting member and the threaded member lower portion includes a fixed collar having an upwardly projecting pin providing said projecting member.

Another aspect of this invention is to provide that said lower portion of the body includes a cylindrical passage, and a spring compartment, said piston means includes a piston having a lower portion received by said passage, an upper portion and an intermediate annular portion having a sealing disc disposed thereon engageable with said valve seating means.

Yet another aspect of this invention is to provide that said piston means includes a bleed passage means extending between said piston upper portion and said piston lower portion and communicating between the valve chamber and the spring compartment.

In another aspect of this invention said piston means include an annular flange providing said annular portion and a threaded axial opening, and said piston upper portion includes a threaded stem received within said threaded axial opening and a head having an annular abutment portion engaging said sealing disc for clamping said sealing disc against said annular flange.

It is an aspect of this invention to provide that said piston upper portion includes a plurality of circumferentially disposed fluted portions.

It is another aspect of this invention to provide that said piston upper portion is generally tapered, and said bleed passage means includes an axial passage and a plurality of transverse passages communicating with said axial passage and with said fluted portions.

Yet another aspect of this invention is to provide that the body includes an intermediate portion disposed between the upper portion and the lower portion and providing the valve chamber, said intermediate portion receiving the push rod in sliding relation, and to provide a cup seal between said push rod and said intermediate body portion to seal the stepper motor from said valve chamber, and another aspect to provide sealing means between said piston and said passage receiving said piston, to seal said spring compartment from said valve chamber.

This invention provides an electronically operated expansion valve which is relatively easy and inexpensive to manufacture and is very effective in operation.

BRIEF DESCRIPTION OF THE DRAWINGS

FIG. 3 is an enlarged detail of the piston assembly in the valve closed position;

FIG. 4 is a cross sectional view taken on line 4—4 of FIG. 2;

FIG. 5 is a cross section taken on line 5—5 of FIG. 2;

FIG. 6 is an enlarged detail of the push rod assembly in the valve open position;

FIG. 8 is a schematic of a refrigeration system incorporating the expansion valve.

DESCRIPTION OF THE PREFERRED EMBODIMENT

Figure 1:
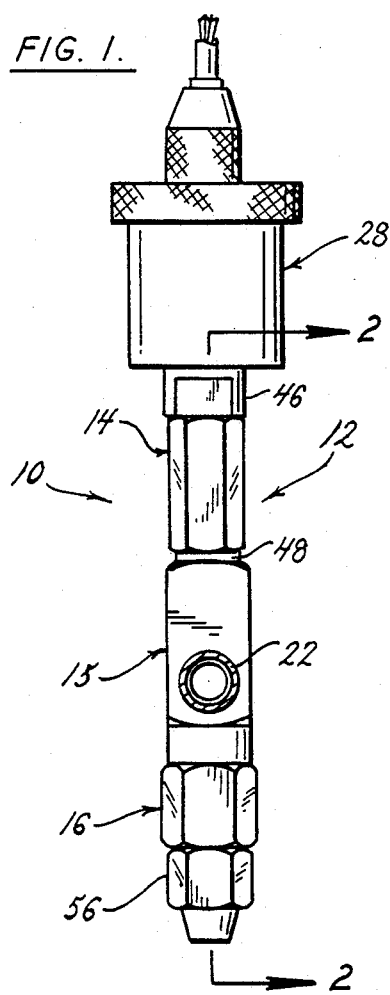
FIG. 1 is an elevational view of the expansion valve assembly.
Figure 2:
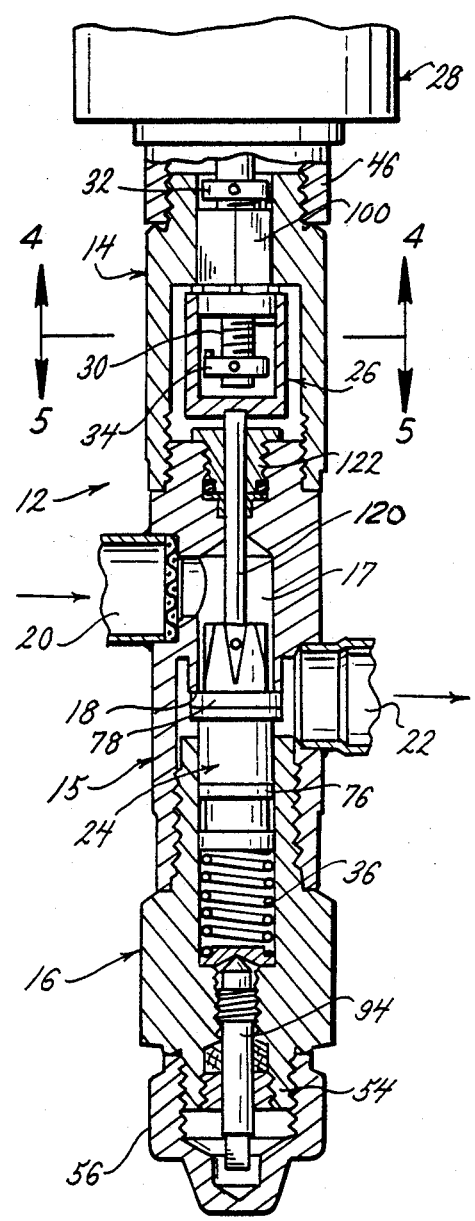
FIG. 2 is an enlarged longitudinal section taken on line 2—2 of FIG. 1 in the valve closed position.

Referring now by reference numerals to the drawings and first to FIGS. 1 and 2, it will be understood that the expansion valve assembly 10 includes a valve body 12 having an upper portion 14 and a lower portion 16 separated by an intermediate body portion 15 providing a valve chamber 17 and defining a valve port 18.

An inlet means 20 receiving refrigerant from the condensor (see FIG. 8) is connected to the intermediate body portion 15 and an outlet means 22 discharging refrigerant to the evaporator (see FIG. 8) is also connected to the intermediate body portion 15. A piston assembly 24 is housed generally in the lower and intermediate body portions and is movable between a valve open and valve closed position. A push rod assembly 26 is housed generally in the upper and intermediate body portion and is connected between a stepper motor 28 and the piston assembly 24. The stepper motor 28 includes a rotatable threaded shaft 30 providing a lead screw, which is part of the stepper motor rotor and is threadedly received by the push rod assembly 26 to induce linear movement into said push rod assembly and thereby provide actuating means for moving said piston assembly 24 between the valve open and closed position. The movement of the piston assembly 24 is governed by the stroke of the push rod assembly 26 which is governed, in turn, by stop means limiting the upper and lower linear positions of the push rod assembly 26. In the embodiment shown, upper and lower cooperating stop means are provided between the threaded shaft 30 and the push rod assembly 26, generally indicated by numerals 32 and 34, respectively, which are engageable to determine the stroke of the push rod assembly and therefore the piston assembly to which it is connected. Also in the embodiment shown, the piston assembly 24 and the push rod assembly 26 are maintained in engagement by a return spring assembly 36 housed in the lower body portion 16. The components of the expansion valve assembly will now be more particularly described with reference to FIGS. 3–6.

The upper portion 14 of the expansion valve body 12 has a generally hexagonal exterior and includes an upper hexagonal passage 40 and a lower cylindrical passage 42. The upper end 44 is threaded for connection to an internally threaded adaptor portion 46 formed on the lower end of the housing of the stepper motor housing 28. The lower end 48 is threaded for connection to the upper end 50 of the intermediate portion 15, which has a generally square exterior, and is threaded for connection to the upper end 52 of the lower portion 16, which has a generally hexagonal exterior, and is threaded at its lower end 54 to receive a cap 56.

The intermediate portion 15 cooperates with the lower portion 16 to define the valve chamber 17 which includes a cylindrical passage 60 communicating with the inlet means 20 and an annular recessed passage 62 communicating with the outlet means 22. The passages 60 and 62 cooperate to define an annular wall 64 having an end face 66 constituting a valve seating means.

Figure 7:
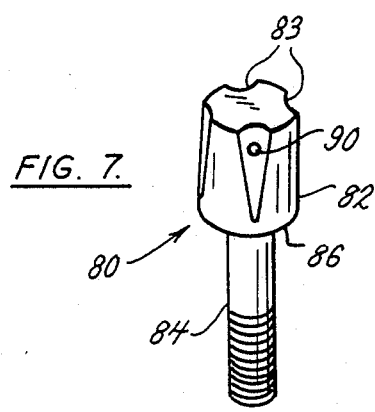
FIG. 7 is a perspective view of the piston nose.

The piston assembly 24 is best understood by reference to FIG. 3 which shows the structural arrangement of parts in the valve closed position. As shown, the assembly includes a piston 68 having a flanged head 70 and a shaft 72 received in sliding relation within a passage 74 formed within the lower body portion 16. The shaft 72 is in two part to receive a seal 76 of Teflon, or the like. The flanged head 70 provides a seat for an annular seal or seating disc 78 of Teflon, or the like, which is clamped to said head 70 by a piston nose 80. As shown in FIG. 7, the piston nose 80 includes a tapered head portion 82, having a plurality of parabolic flutes 83, and a lower stem portion 84 received within a threaded passage 85 provided within the piston shaft 68, said nose head and stem portions 82 and 84 defining an annular clamping face 86 for clamping the sealing disc 78 to the piston flange 30. The piston nose 80 includes transverse and axial passages 90 and 92, respectively, communicating between the valve chamber 17 and the lower portion of the piston passage 74, indicated by 75, which defines a compartment housing the spring 36, to equalize pressure in the valve chamber 17 and this compartment. It will be understood that spring pressure can be adjusted by means of an adjustment screw 94. It will also be understood that seal 76 provides a seal between the outlet means 22 and the spring compartment 75.

The push rod assembly 26 is best understood by reference to FIG. 6 which shows the structural arrangement of parts in the valve open position. As shown, the assembly includes a nut member 100 which receives the stepper motor threaded shaft 30. The nut 100 has a non-circular cross section, hexagonal in the embodiment shown, and is received in sliding relation within the compatibly configured passage 40. The nut 100 also includes a lower diameter cylindrical portion 102 which receives a cylindrical bonnet member 104 in sliding relation and is grooved to receive a lock ring 106. The upper and lower portions of the nut 100 include radial lugs 108 and 110, respectively constituting "flag" stops. The threaded shaft 30 includes upper and lower spaced collars 112 and 114, respectively which are 2inned to said shaft. The upper collar 112 includes a downwardly projecting rollpin 116 which is engageable with the lug 108 to provide the upper stop means 32 defining the valve open condition. The lower collar 114 includes an upwardly projecting rollpin 118 which is engageable with the lug 110 to provide the lower stop means 34 defining the valve closed condition. Thus, as the stepper motor shaft 30 rotates the nut 100 moves linearly, the extent of the movement being determined by engagement of the rotating pins with the linearly moving lugs, said engagement thereby defining the stroke of the piston 68.

The push rod assembly 26 is connected to the piston assembly 24 by a push rod 120. At its upper end the push rod 120 is received in sliding relation by a guide bushing 122 and the underside of the bonnet 104 is recessed to receive said push rod upper end. At its lower end the push rod 120 engages the piston nose 80 and the push rod 120 thereby effectively connects the bonnet 104 and said nose 80 so that movement of the push rod assembly 26 is reflected by movement of the piston assembly 24. It will be understood that the pin 118 engages lug 110 before the underside of the bonnet 104 engages the guide bushing 122 and the pin 116 engages the lug 108 before the split ring 106 engages the end face 41 of passage 42 so that pin and lug engagement solely determine movement of the push rod assembly 26 and thereby the piston assembly 24.

In order to seal the valve chamber 17 from the stepper motor 28, a cup seal 124 of Teflon, or the like, is provided between the push rod guide bushing 122 and the intermediate body portion 15 in the threaded passage 126 provided for the guide bushing 122.

It is thought that the structural relationship of parts and the functional advantages of this expansion valve have become fully apparent from the foregoing description of parts but for completeness of disclosure the operation of the valve will be briefly described.

Referring to FIG. 8, it will be understood that the expansion valve assembly 10 may be used in a refrigeration system 200 which includes an evaporator 202, a compressor 204 and a condensor 206. The expansion valve stepper motor 28 is responsive to temperature sensors 208 and 210 which input to a microcomputer 212 which is connected to an electronic switch device 214, disposed between a power supply 216 and the stepper motor 28.

In the embodiment shown, the stepper motor is a 24 volt, three-phase variable reluctance motor having a step angle of 3.75 degrees which provides 96 steps per revolution of the motor shaft 30. The shaft 30 is threaded to provide a linear resolution of 0.00033 inch/step, which is equivalent to 0.0317 inch/revolution, and the stop means 30 and 32 are spaced to provide a stroke of 0.250 inches. It will be understood that the drive coupling provided by the threaded relationship between the rotatable shaft 30 and the non-rotatable push rod assembly nut 100 effectively induces linear motion into said nut. The upper and lower rollpins 116 and 118, respectively provided on the shaft 30 interfere with the cooperating upper and lower lugs 108 and 110, respectively, on the nut 100 and restrict rotation of the shaft, and therefore linear movement of the nut, and effectively determine the valve opening. This arrangement allows the motor to stop in a detent position under a known load and avoids a torsional friction stop. As will be understood, the overlapping engagement of a rollpin with an associated lug, with proper setting, will be almost as great as the linear movement experienced by the nut 100 during one revolution of the shaft 30, i.e. about 0.03 inch. The rollpins 116 and 118 have square ends and the corners of the lugs 108 and 110 are milled to provide square corners to optimize engagement between said pins and lugs.

The piston assembly 24 is balanced to the relatively high pressure on the inlet side, by the bleed passages 90 and 92, which extend through the piston nose 80 and communicate with the spring chamber portion of the piston passage 74. The area of the piston passage 74 and the area of the upper portion of the valve chamber 17 are substantially equal thereby eliminating high side force on the piston assembly 24 and reducing load on the stepper motor 28. The Teflon seating disc 86 provides for tight sealing of the valve port 18. The Teflon seal on the piston 76 is used to prevent high to low side leakage. While the Teflon cup seal 124 on the push rod is used to prevent high to low side leakage around the push rod and also to prevent dirt from damaging the stepper motor and bearings. The combination of these seals also allows the valve to act as a solenoid valve for pump down cycles.

The tapered configuration of the piston nose 80, which is fluted in form and is machined with four parabolic surfaces, in the embodiment shown, facilitates linear flow through the entire valve stroke.

Although the improved expansion valve has been described by making particular reference to a preferred expansion valve assembly, the details of description are not to be understood as restrictive, numerous variants being possible within the principles disclosed and within the fair scope of the claims hereunto appended.

We claim as our invention:

1. An expansion valve comprising:
    (a) a hollow body including an upper portion, a lower portion and a valve chamber disposed between said upper and lower portions and including a valve port having seating means,
    (b) an inlet means communicating with the valve chamber on one side of the valve port and an outlet means communicating with the valve chamber on the other side of the valve port,
    (c) piston means linearly movable in said body between a valve open and valve closed position, said piston means being operatively seated against said valve port seating means in the closed position,
    (d) push rod means including a threaded member mounted for linear movement in the body and operatively engageable with the piston means to induce linear movement into said piston means, said push rod means including stop means,
    (e) a stepper motor carried by the upper portion of the body and including a rotatable shaft means threadedly received by the threaded member of the push rod means, said rotatable shaft means including cooperating stop means engageable with the stop means of the push rod means to limit angular rotation of the rotatable shaft means whereby to precisely determine linear travel of the push rod means and the piston means, and
    (f) spring means carried by the lower portion of the body and operatively engageable with the piston means to urge the piston means into operative engagement with the push rod means.

2. An expansion valve as defined in claim 1, in which:
    (g) the push rod threaded member receiving the rotatable shaft means is adapted to slide linearly and non-rotatively in the upper portion of the body and includes a projecting member providing the stop means, and
    (h) the threaded shaft means includes a projecting member providing the stop means and being engageable with the push rod member projecting member to determine the sealing pressure of the piston means on the valve seating means.

3. An expansion valve as defined in claim 1, in which:
    (g) the push rod threaded member receiving the rotatable shaft means is adapted to slide linearly and non-rotatively in the upper portion of the body and includes upper and lower projecting members disposed in spaced relation and providing the stop means, and
    (h) the rotatable shaft means includes upper and lower projecting members providing the stop means and being engageable with associated upper and lower push rod projecting members to determine the stroke of the piston means, engagement of associated lower projecting members determining the sealing pressure of the piston means on the valve seating means.

4. An expansion valve as defined in claim 1, in which:
    (g) the upper portion of the body includes a non-circular passage,
    (h) the push rod means includes an upper internally threaded member receiving the rotatable shaft means and being externally configured to be received in sliding relation in said non-circular body passage, a lower housing member carried by said threaded member, and a push rod extending between said housing member and said piston means, said threaded member including upper and lower projecting members providing said stop means, and
    (i) said rotatable shaft means includes an upper portion disposed above said threaded member and a lower portion disposed below said threaded member within said housing member, said upper and lower portions each including a projecting member providing said stop means and being engageable with an associated projecting member of said threaded member.

5. An expansion valve as defined in claim 4, in which:
    (j) the threaded member upper portion includes a fixed collar having a downwardly projecting pin providing said projecting member and the threaded member lower portion includes a fixed collar having an upwardly projecting pin providing said projecting member.

6. An expansion valve as defined in claim 1, in which:
    (g) said lower portion of the body includes a cylindrical passage, and a spring compartment disposed below said passage,
    (h) said piston means includes a piston having a lower portion received by said passage, an upper portion and an intermediate annular portion having a sealing disc disposed thereon engageable with said valve seating means.

7. An expansion valve as defined in claim 6, in which:
    (i) said piston means includes a bleed passage means extending between said piston upper portion and said piston lower portion and communicating between the valve chamber and the spring chamber.

8. An expansion valve as defined in claim 7, in which:
    (j) said piston means include an annular flange providing said annular portion and a threaded axial opening, and
    (k) said piston upper portion includes a threaded stem received within said threaded axial opening and a head having an annular abutment portion engaging said sealing disc for clamping said sealing disc against said annular flange.

9. An expansion valve as defined in claim 8, in which:
    (l) said piston upper portion includes a plurality of circumferentially disposed fluted portions.

10. An expansion valve as defined in claim 9, in which:
    (m) said piston upper portion is generally tapered, and
    (n) said bleed passage means includes an axial passage and a plurality of transverse passages communicating with said axial passage and with said fluted portions.

11. An expansion valve as defined in claim 4 in which:
    (j) the body includes an intermediate portion disposed between the upper portion and the lower portion and providing the valve chamber, said intermediate portion receiving the push rod in sliding relation, and
    (k) a cup seal is provided between said push rod and said intermediate body portion to seal the stepper motor from said valve chamber.

12. An expansion valve as defined in claim 7, in which:
    (j) the body includes an intermediate portion disposed between the upper portion and the lower portion and defining the valve chamber, and
    (k) sealing means is provided between said piston and sid passage receiving said piston, to seal said spring chamber from said valve chamber.

* * * * *

UNITED STATES PATENT AND TRADEMARK OFFICE
CERTIFICATE OF CORRECTION

PATENT NO. : 4,911,404

DATED : March 27, 1990

INVENTOR(S) : Dorste et al.

It is certified that error appears in the above-identified patent and that said Letters Patent is hereby corrected as shown below:

ABSTRACT, line 10, delete "28" and insert --(28)--

Column 1, line 7, delete "sytems" and insert --systems--

Column 5, line 5, delete "part" and insert --parts--

Column 5, line 41, delete "2inned" and insert -- pinned--

Column 7, line 37, delete "claim I" and insert --claim 1--

Column 8, line 67, delete "sid" and insert --said--

Signed and Sealed this

Eighteenth Day of February, 1992

Attest:

HARRY F. MANBECK, JR.

*Attesting Officer*  *Commissioner of Patents and Trademarks*